(12) United States Patent
Le

(10) Patent No.: US 8,908,111 B2
(45) Date of Patent: Dec. 9, 2014

(54) LIQUID CRYSTAL DISPLAY DEVICE AND METHOD FOR MANUFACTURING THE SAME

(75) Inventor: Min-Jic Le, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 91 days.

(21) Appl. No.: 13/185,293

(22) Filed: Jul. 18, 2011

(65) Prior Publication Data

US 2012/0019744 A1  Jan. 26, 2012

(30) Foreign Application Priority Data

Jul. 23, 2010  (KR) .................. 10-2010-0071652

(51) Int. Cl.
*G02F 1/1335* (2006.01)
*H04N 13/04* (2006.01)
*G02B 27/26* (2006.01)
*G02B 5/30* (2006.01)
*G02F 1/1343* (2006.01)
*G02F 1/1362* (2006.01)
*G02F 1/13363* (2006.01)

(52) U.S. Cl.
CPC ........ *H04N 13/0434* (2013.01); *G02F 2203/62* (2013.01); *G02F 1/133555* (2013.01); *G02F 1/134363* (2013.01); *G02F 1/1362* (2013.01); *H04N 2213/001* (2013.01); *G02F 2001/133631* (2013.01); *G02F 1/1336* (2013.01); *G02B 27/26* (2013.01); *G02F 2201/124* (2013.01); *G02B 5/3083* (2013.01); *G02F 1/133512* (2013.01)
USPC ........................................... 349/15; 349/110

(58) Field of Classification Search
CPC ..................... G02B 27/2214; H04N 13/0411
USPC .............. 349/15, 110, 117, 67, 141; 362/623
See application file for complete search history.

(56) References Cited

U.S. PATENT DOCUMENTS

| | | | |
|---|---|---|---|
| 6,046,849 A * | 4/2000 | Moseley et al. ............... | 359/465 |
| 7,924,373 B2 * | 4/2011 | Louwsma ..................... | 349/106 |
| 7,969,541 B2 * | 6/2011 | Okuyama et al. ............. | 349/117 |
| 8,208,092 B2 * | 6/2012 | Yamazaki et al. .............. | 349/67 |
| 8,226,287 B2 * | 7/2012 | Teng et al. .................... | 362/625 |
| 2003/0142260 A1 * | 7/2003 | Asai et al. ..................... | 349/141 |
| 2007/0008471 A1 * | 1/2007 | Wang et al. ................... | 349/117 |
| 2008/0180619 A1 * | 7/2008 | Kashima ....................... | 349/117 |
| 2009/0167998 A1 * | 7/2009 | Park et al. ..................... | 349/114 |
| 2009/0316089 A1 * | 12/2009 | Shin et al. ..................... | 349/110 |
| 2010/0014313 A1 * | 1/2010 | Tillin et al. .................... | 362/606 |
| 2010/0302484 A1 * | 12/2010 | Yoo et al. ...................... | 349/110 |
| 2010/0302634 A1 * | 12/2010 | Jung ............................. | 359/465 |

* cited by examiner

*Primary Examiner* — Richard Kim
*Assistant Examiner* — Kendrick Hsu
(74) *Attorney, Agent, or Firm* — Brinks Gilson & Lione

(57) ABSTRACT

The present invention is for a liquid crystal display device having a patterned retarder enabling stereoscopic image display and a light reflector capable of improving luminous efficiency provided on a panel of the display device, and a manufacturing method thereof, the liquid crystal display device includes; first and second substrates arranged opposite each other, a light reflector on the first substrate, a first black stripe on the second substrate facing to the light reflector corresponding to the light reflector, a liquid crystal layer formed between the first and second substrates, a retarder provided on top of the second substrate, a reflector placed below the first substrate, and a light source positioned below the reflector.

16 Claims, 18 Drawing Sheets

Gate

ACT/SD

Pixel

Pixel

LIQUID CRYSTAL DISPLAY DEVICE AND METHOD FOR MANUFACTURING THE SAME

Pursuant to 35 U.S.C. §119(a), this application claims the benefit of earlier filing date and right of priority to Korean Application 10-2010-0071652, filed on Jul. 23, 2010, the content of which is incorporated by reference herein in its entirety.

BACKGROUND

1. Field of the Invention

The present disclosure relates to a liquid crystal display device and, more particularly, to a liquid crystal display device including a patterned retarder enabling stereoscopic image display and a light reflector provided on a panel of the display device to improve luminous efficiency, as well as a manufacturing method thereof.

2. Discussion of the Related Art

Services for rapidly providing information over a high speed communication network have been developed from 'listening and speaking' services, such as provided by a telephone, to 'viewing and listening' multimedia type services using a digital terminal for rapidly processing text, voice and image data and, ultimately, to a three-dimensional stereoscopic information communication service for providing realistic stereoscopic viewing and entertainment, in order to implement '3-dimensionally viewing and enjoying above time and space.'

In general, the eyes form a three dimensional image based upon the principle of stereovision. Since two eyes have a disparity therebetween, that is, since two eyes are separated from each other by about 65 mm, the left eye and the right eye view slightly different images. A difference between images caused by such difference between the positions of the two eyes is referred to as 'binocular disparity'. A three-dimensional image display device enables the left eye to view only an image for the left eye and the right eye to view only an image for the right eye according to such binocular disparity.

That is, the left and right eyes view two different two-dimensional images. Once these images are received by the retina and sent to the brain, they are processed into a three dimensional image by the brain, providing a sense of depth to the viewer. This capability is generally referred to as 'stereography' and a device having this capability is referred to as a stereoscopic image display device.

Hereinafter, with reference to the accompanying drawings, a liquid crystal display device of related art enabling stereoscopic display using glasses will be described.

FIG. 1 is a schematic view illustrating a stereoscopic liquid crystal display device using glasses of related art.

Referring to FIG. 1, the liquid crystal display device of related art has a liquid crystal panel 10 independently displaying left and right (eye) images per a pixel basis, a retarder 20 having first and second different transmission axes that distinguish the above left images from the right images of the liquid crystal panel 10 and recognize corresponding images, respectively, and a pair of polarized glasses 30 outward of this panel, for example, worn by a user.

Here, the polarized glasses 30 have a left (eye) lens L and a right lens R having respective transmission axes, wherein the left lens L and the right lens R include polarized reflectors having the same first and second transmission axes as of the retarder 20, respectively.

The retarder 20 is spatially divided and patterned to provide each pixel with first and second transmission axes and, in this case, is fixed to the liquid crystal panel 10.

The retarder 20 is a patterned film to embody linear polarization in each direction of the first and second transmission axes.

Such a retarder 20 may be mounted on the liquid crystal panel 10 to spatially separate both the left and right images, and be patterned to embody two sets of vertical linear polarizations intersecting each other depending upon positions of the left and right images.

As shown in the drawings, if the left image is displayed in a polarizing direction at a right angle (90°) while displaying the right image in another polarizing direction at an angle of 0 degrees, a user wearing the polarized glasses 30 may recognize the right image transmitted through the first transmission axis through the left lens L and the left image transmitted through the second transmission axis through the right lens R, respectively, thereby perceiving a 3-dimensional image based on binocular disparity.

FIGS. 2A and 2B are plan views illustrating a pixel region and a black-striped region in a structure having the foregoing patterned retarder.

If the structure has the retarder 20, pixels for the left and right images are arranged adjacent to each other in the liquid crystal panel 10, resulting in problems associated with crosstalk between two adjacent regions that display different images during 3D viewing.

In order to prevent crosstalk between left and right images, a black stripe 21 may be provided to each pixel P, as shown in FIG. 2B.

Reference number 22 not shown in FIG. 2A, refers to a wiring region on which gate wires or data wires are formed and which has a pixel region comprising respective pixels P defined in the wiring region.

A liquid crystal display device of related art enabling stereoscopic display in glasses mode has the following problems.

For such a liquid crystal display device described above, crosstalk occurs at adjacent parts of pixels, from which left and right images are displayed. In order to prevent such crosstalk, the display device usually has a black-striped structure.

The black stripe in the foregoing structure occupies a larger area than a black matrix or a wiring region present in a liquid crystal panel and effectively blocks passage of light therethrough. Therefore, due to the black stripe, an aperture ratio may be reduced, thus significantly deteriorating luminous efficiency.

BRIEF SUMMARY

A liquid crystal display device includes: first and second substrates arranged opposite each other; a light reflector on the first substrate; a first black stripe formed on the second substrate facing the light reflector corresponding to the light reflector; a liquid crystal layer formed between the first and second substrates; a retarder provided on a top of the second substrate; a reflector provided on a bottom of the first substrate; and a light source positioned below the reflector.

A method for manufacturing a liquid crystal display device, includes; positioning a light guide plate and arranging a light source at either side or both sides of the light guide plate, providing a reflector on the light guide plate, placing a first substrate on a top of the reflector and providing a light reflector on the first substrate, arranging a second substrate to face the first substrate, wherein the second substrate has a first black stripe at a predetermined location corresponding to the light reflector, forming a liquid crystal layer between the first and second substrates, and placing a retarder on the second substrate.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Hereinafter, with reference to the accompanying drawings, preferred embodiments of a liquid crystal display device and a manufacturing method thereof according to the present invention will be described in detail.

Figure 1:
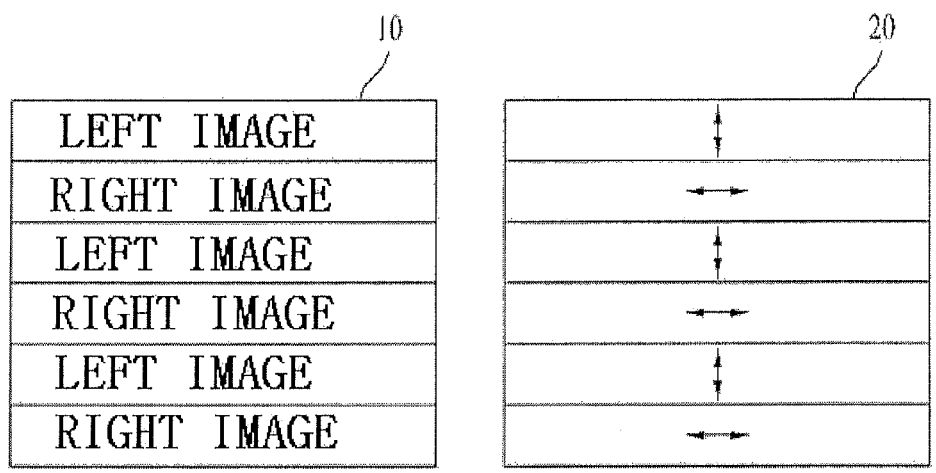
FIG. 1 is a schematic view illustrating a liquid crystal display device for stereoscopic image display in glasses mode of related art.
Figure 1:
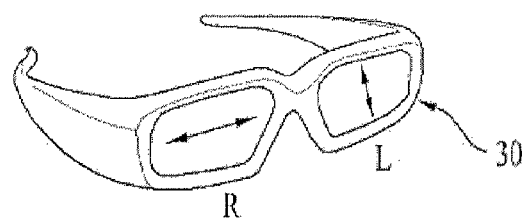
Figure 2A:
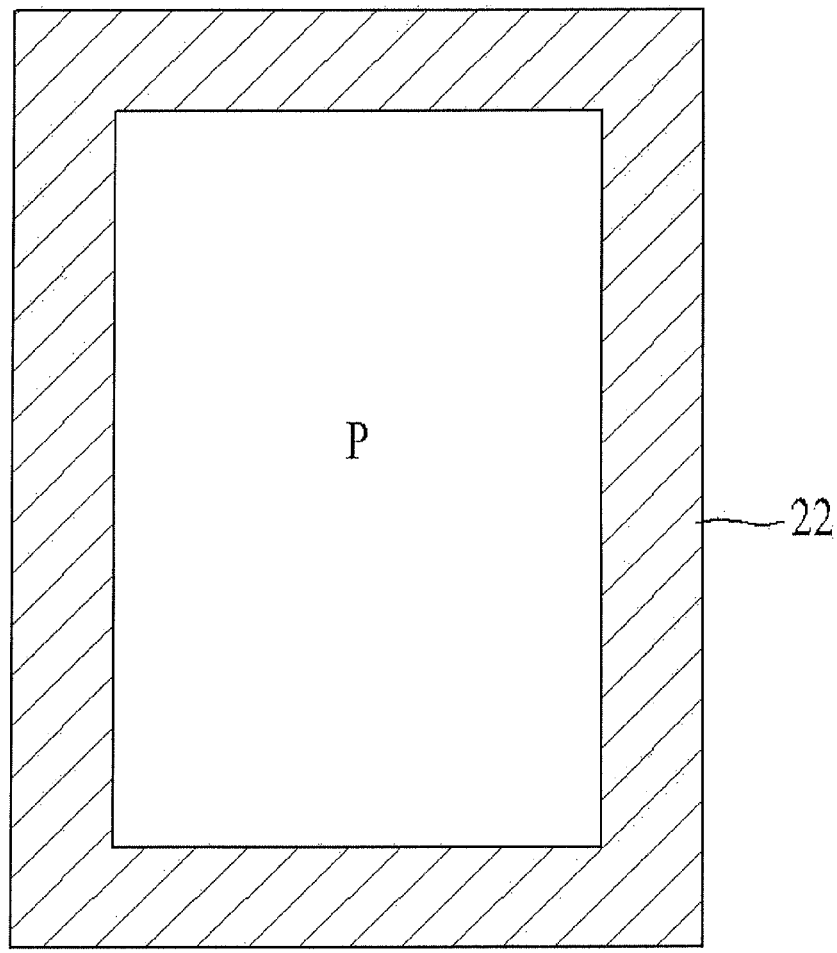
FIG. 2 is a plan view illustrating a pixel region with a structure having a patterned retarder, and a black-striped region.
Figure 2B:
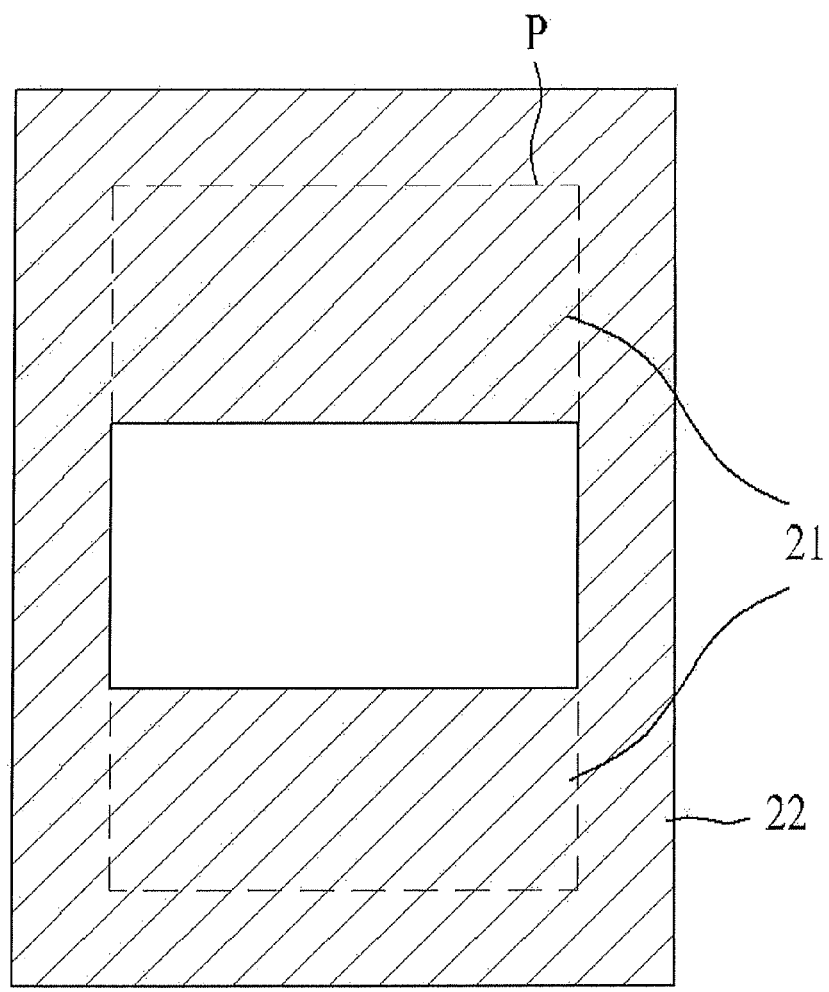
Figure 3:
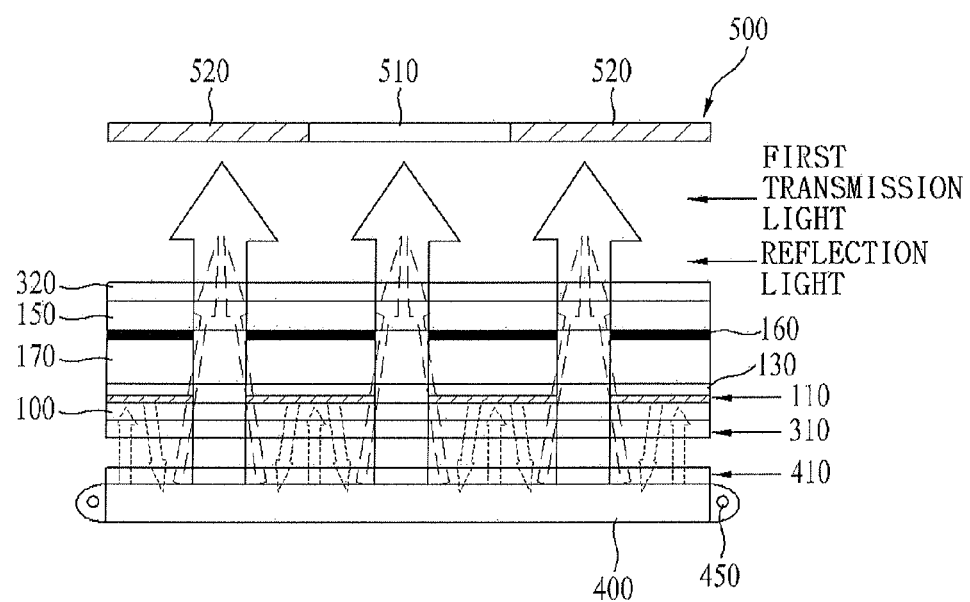
FIG. 3 is a cross-sectional view illustrating a liquid crystal display device according to an embodiment of the present invention.

FIG. 3 is a cross-sectional view illustrating a liquid crystal display device according to the present invention.

Referring to FIG. 3, the inventive liquid crystal display device comprises: first and second substrates 100 and 150 arranged opposite each other; a light reflector 110 provided on the first substrate 100; a first black stripe 160 formed on the second substrate 150 opposite to the light reflector 110 at a predetermined site corresponding to the light reflector 110; a liquid crystal layer 170 formed between the first and second substrates 100 and 150; a retarder 500 placed above the second substrate 150; a reflector 410 placed below the first substrate 100; and a light source 450 positioned below the reflector 410.

The inventive display device may further include first and second polarizers 310 and 320 placed at outer surfaces of the first and second substrates 100 and 150, respectively.

The retarder 500 is divided into a left image display region 510 and a right image display region 520, and may be a film type retarder patterned such that these display regions 510 and 520 have different light transmission axes or, optionally, may be an electrically switchable retarder in which the left and right regions are divided from each other by applied electric field. The latter directly emits light from the bottom of the display when no electric field is applied thereto. Since the switchable retarder requires applied voltage, a voltage source and a connector for the same may be provided.

Since an adjacent part between the left and right image display regions 510 and 520 in the retarder 500 is likely to suffer interference, it is preferable to allow this part to face the first black stripe 160 formed on the second substrate 150. In this case, the first black stripe 160 is additionally formed or extended longer than a second black stripe (a general black matrix layer) corresponding to wirings provided on the first substrate 100, thus possibly decreasing an aperture ratio of pixels.

In order to reduce a decrease in luminous efficiency owing to the first black stripe 160, that is, to improve luminous efficiency, the inventive liquid crystal display device may further include the light reflector 110 formed on a top of the substrate 100 by utilizing any one of wirings that are mounted on the first substrate 100 to correspond to the first black stripe 160.

The reflector 410 at the bottom of the display device (or referred to as 'bottom reflector') is reflected upward by the light reflector 110, thus enabling the light to penetrate through the light reflector 110 adjacent to the reflector 410.

In other words, as shown in the same figure, light directly emitted from the light guide plate 400 as well as the firstly transmitted light (solid line arrow) is combined with the secondly transmitted light (dash-dotted arrow), which was emitted from the light reflector 110 and then reflected again at the bottom reflector 410, and pass through the first black stripe 160. Therefore, it can be seen that the light reflector 110 enhances light transmission efficiency. Briefly, light transmission is indirectly conducted by double reflection through the light reflector 110 and the bottom reflector 410, thus increasing luminous efficiency by at least 50%, compared to a structure without the light reflector.

In addition, the light reflector 110 does not require an alternative fabrication process, instead being patterned using the same material as is used for a gate line or data line during fabrication of a thin film transistor array on the first substrate 100. Therefore, luminous efficiency may be enhanced without increasing the number of processing stages.

In general, a liquid crystal panel refers to a combination of a first substrate 100, a second substrate 150, a liquid crystal layer 170 formed therebetween, a thin film transistor array provided on the first substrate 100 (including the light reflector 110 described above) and a color filter array (including the first black stripe 160 described above) provided on the second substrate 150.

Alternatively, the retarder 500 may be directly adhered to the second polarizer 320, as shown in FIG. 3, or optionally, be placed inside the second substrate 150.

The light source is arranged opposite to an edge part of the first substrate 100. Here, the light guide plate 400 is provided below the reflector 410, in order to guide light from the light source 450 upward.

Other than arrangement of the light source in an edge configuration, optionally, even when the light source may is positioned below the first substrate 100 in a drop configuration, luminous efficiency may be enhanced by arranging the light reflector 110 inside the first substrate 100.

A gate line and a data line intersecting each other may be further provided on the first substrate 110. Since the light reflector 110 receives applied common line signals, this component may be directly employed as a common line to which signals are applied.

Meanwhile, the light reflector 110 may be present on a layer of the first substrate 100, on which the gate line or data line is present, and/or made of the same metal as is used for the gate line or data line.

In the case of a transverse electric configuration liquid crystal display device, a pixel electrode (see 203 in FIG. 6) and a common electrode (see 205 in FIG. 6) alternating each other may be present in the pixel region.

When the liquid crystal display device to be embodied is in a fringe field switching (FFS) mode, island type pixel electrode (see 103 in FIG. 4) and a common electrode pattern 105 having a plurality of branched patterns while overlapping the pixel electrode 103, may be placed in the pixel region.

The light reflector 110 may be electrically connected to each of the common electrodes or be integrated with the same, depending upon mode of the liquid crystal display device.

The light reflector 110 may be fabricated in the form of at least one layer comprising at least one selected from aluminum (Al), aluminum alloy (e.g., AlNd), molybdenum (Mo), molybdenum alloy, chrome (Cr) and copper (Cu).

Other than the first black stripe described above, a second black stripe (see 165 in FIG. 5) to shield the gate line and the data line may be further included.

The following description will be given to concretely explain technical configurations of a liquid crystal display device according to the present invention, with respect to configuration modes of a liquid crystal panel of the display device.

Figure 4:
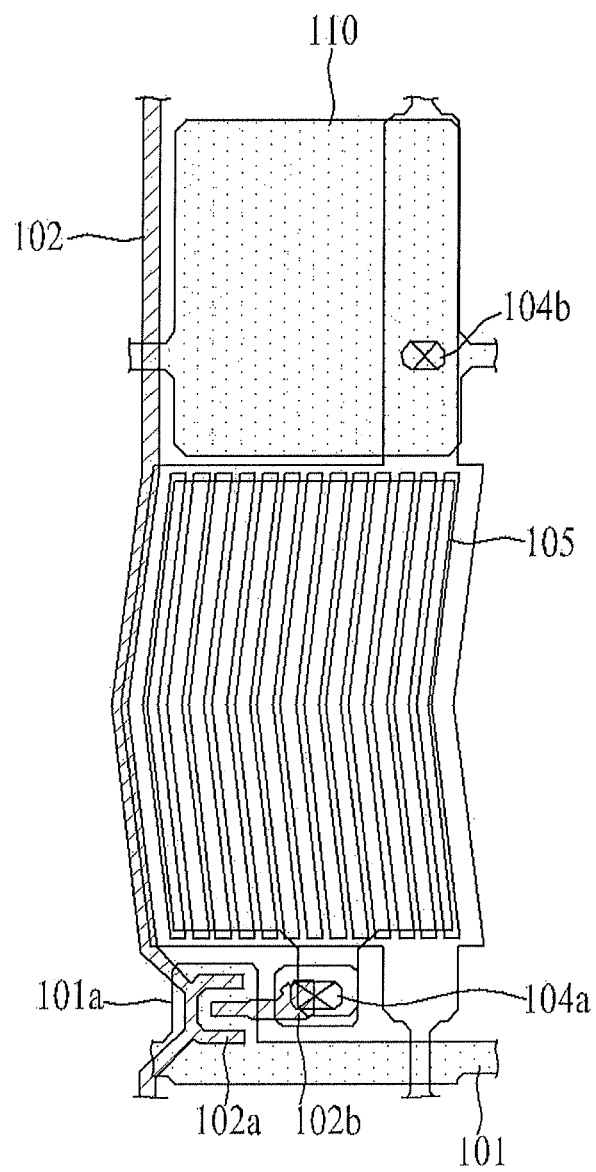
FIG. 4 is a plan view illustrating a liquid crystal display device according to an exemplary embodiment of the present invention.

FIG. 4 is a plan view illustrating a liquid crystal display device according to an exemplary embodiment of the present invention.

Referring to FIG. 4, the liquid crystal display device according to the exemplary embodiment of the present invention comprises: a first substrate 100; a gate line 101 and a data line 102 intersecting each other to define pixel regions; a thin film transistor placed at an intersection of the gate line 101 and the data line 102; a light reflector 110 occupying a predetermined area (width) in the pixel region while being arranged in parallel to the gate line 101; island type pixel electrode 103 present on an area within which the light reflector 110 is not present; and a common electrode pattern 105 overlapping the pixel electrode 103 and having branched patterns at the overlap site as well as a second contact hole 104b in contact with the light reflector 110.

Here, the pixel electrode 103 may be electrically connected to contact a drain electrode 102b through a first contact hole 104a.

Further, the common electrode pattern 105 may include a common electrode support pattern 105a which is electrically connected to the light reflector 110 via the second contact hole 104b. The light reflector 110 receives applied common electrode signals at both ends of the first substrate 100.

Meanwhile, the thin film transistor includes; a gate electrode 101a protruding from the gate line 101, a source electrode 102a protruding from the data line 102, the drain electrode 102b being spaced from the source electrode, and a semiconductor layer (not shown) having two ends to which the source electrode 102a and the drain electrode 102b are connected, respectively.

The liquid crystal display device according to the foregoing exemplary embodiment employs an FFS configuration, wherein flat pixel electrode 103 electrically contact the light reflector 110. In an FFS configuration, an electric field is formed between the branched patterns of the common electrode pattern 105 that overlap the pixel electrode 103, thereby driving liquid crystals.

Although the foregoing exemplary embodiment describes formation of the light reflector 110 on a layer on which the gate line 101 is present, the light reflector 110 may instead be provided on a layer on which the data line is positioned. In such case, forming a different metal layer at an intersection between the gate line and the data line may enable light reflectors in adjacent pixel regions to be connected.

Figure 5:
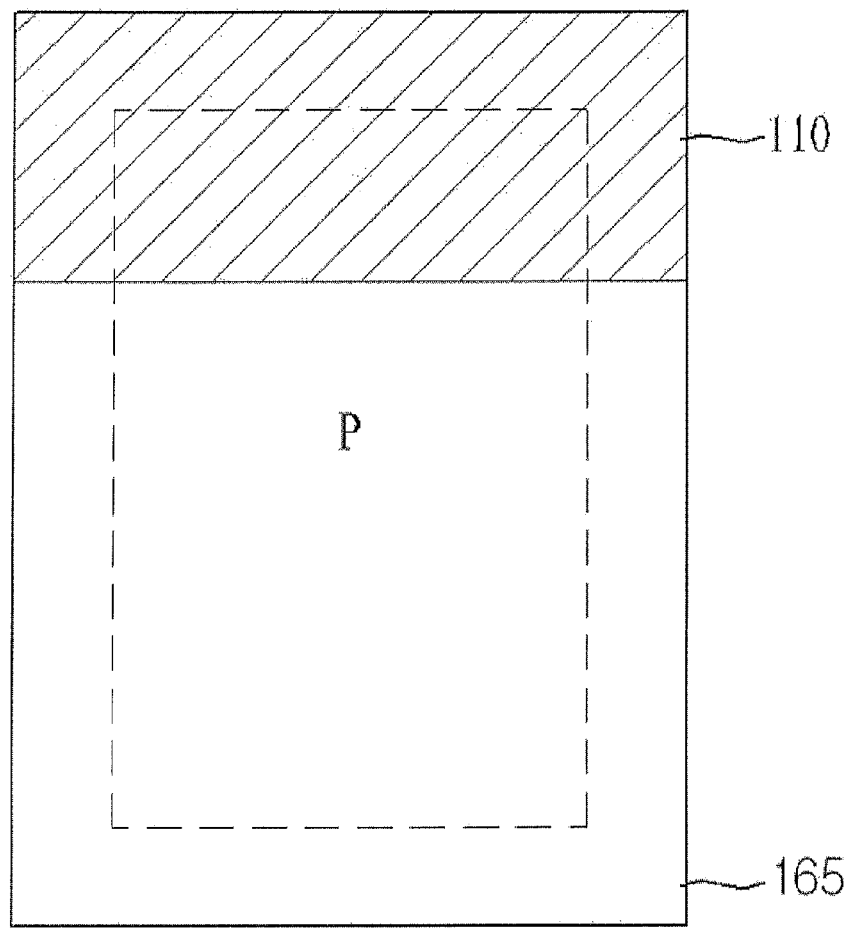
FIG. 5 is a plan view illustrating a pixel region and a light reflector area in a liquid crystal display device of the present invention.

FIG. 5 is a plan view illustrating a pixel region and an area on which a light reflector of the liquid crystal display device according to the present invention is formed.

Referring to FIG. 5, according to the foregoing exemplary embodiment, morphologies of an area on which the light reflector 110 is present and the remaining area of the gate line and the data line on which the second black stripe 165 is formed, are illustrated in plan view.

Here, the first black stripe 160 may correspond to the light reflector 110.

The area of the light reflector 110 may be increased or decreased according to an interference area to be shielded.

The following description will be given to explain a liquid crystal display device according to another exemplary embodiment of the present invention.

Figure 6:
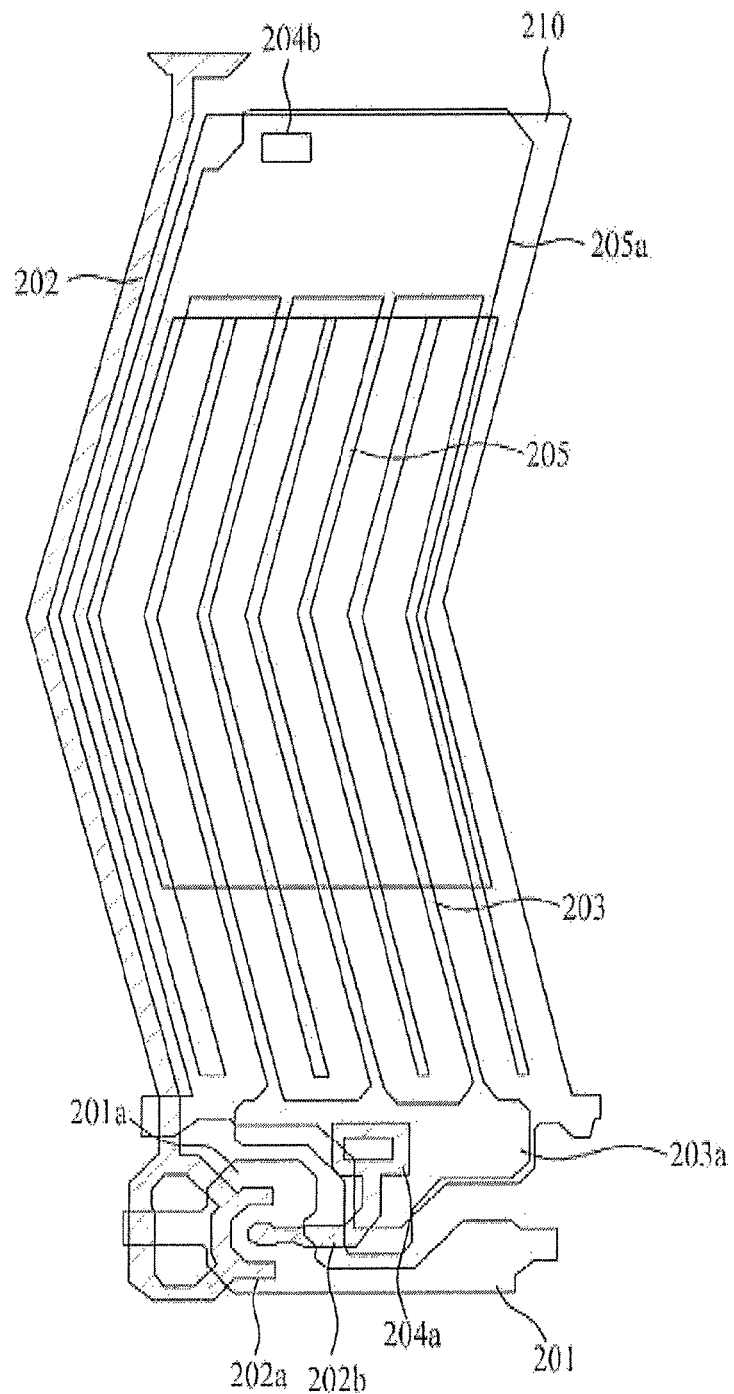
FIG. 6 is a plan view illustrating a liquid crystal display device according to another exemplary embodiment of the present invention.

FIG. 6 illustrates the liquid crystal display device according to this exemplary embodiment of the present invention.

Referring to FIG. 6, the liquid crystal display device according to the foregoing exemplary embodiment of the present invention comprises: a first substrate 200; a gate line 201 and a data line 202 intersecting each other to define pixel regions; a thin film transistor placed at an intersection between the gate line 201 and the data line 202; a light reflector 210 occupying a predetermined area in a vertical direction in the pixel region while being arranged on a peripheral side of the pixel region; and pixel electrodes 203 and common electrodes 205 arranged alternately in the pixel region.

A pixel electrode support pattern 203a is provided below the pixel electrodes 203 in a branched form, in order to connect these pixel electrodes 203 to one another. The pixel electrode support pattern 203a is electrically connected to a drain electrode 202b via a first contact hole 204a.

The common electrodes 205 are positioned on the same layer as the pixel electrodes 203 and are formed in a branched pattern such that each of the common electrodes is placed between adjacent pixel electrodes 203. Moreover, the branched common electrodes 205 are integrated with the common electrode support pattern 205a at a top end thereof.

The common electrode support pattern 205a is electrically connected to the light reflector 210 via a second contact hole 204b and receives applied common electrode signals.

Meanwhile, as described above, the thin film transistor includes; a gate electrode 201a protruding from the gate line 201, a source electrode 202a protruding from the data line 202, the drain electrode 202b spaced from the source electrode, and a semiconductor layer (not shown) having both ends, to which the source electrode 202a and the drain electrode 202b are connected, respectively.

The liquid crystal display device according to the foregoing exemplary embodiment adopts an In-Plane Switching (IPS) mode, wherein the common electrodes 205 and the pixel electrodes 203 are arranged alternately and, as shown in the figure, may be placed on the same layer by patterning the same transparent electrodes. Otherwise, the common electrodes and the pixel electrodes may be formed using different metals and arranged on different layers. In such case, a horizontal electric field may be formed between the pixel electrodes 203 and the common electrodes 205, which in turn allows liquid crystals in the liquid crystal layer to be driven.

Hereinafter, preferred embodiments of a method for manufacturing a liquid crystal display device according to the present invention will be described in detail.

FIGS. 7A through 7F are cross-sectional views illustrating a process of manufacturing a liquid crystal display device according to an exemplary embodiment of the present invention.

Figure 7A:
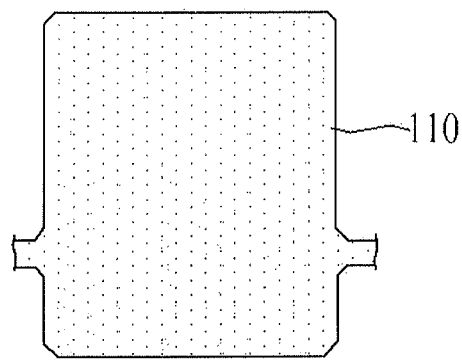
FIGS. 7A through 7F are cross-sectional views illustrating a process of manufacturing a liquid crystal display device according to an exemplary embodiment of the present invention.
Figure 7A:
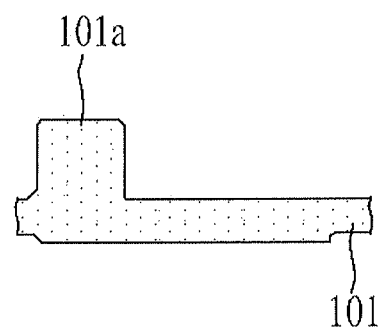

First, as shown in FIG. 7A, the process of manufacturing a liquid crystal display device according to the forgoing exemplary embodiment of the present invention comprises: depositing a first metal on a first substrate 100 and selectively removing the same, in order to form a gate line 101 in one direction and a gate electrode 101a protruding from the gate line 101; and forming a light reflector 110 occupying a predetermined area (width) in a pixel region. The first metal used herein may include at least one selected from Al, Al alloy (e.g., AlNd), Mo, Mo alloy, Cr and Cu deposited in the form of a layer or a laminate comprising two or more layers.

Then, a gate insulating film (not shown) is formed throughout a front side of the first substrate 100 including the gate line 101.

Figure 7B:
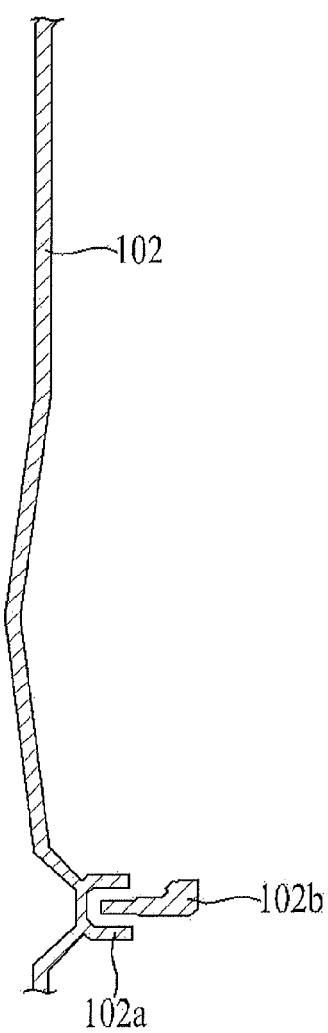

Next, as shown in FIG. 7B, a semiconductor layer (not shown) and a second metal are laminated onto the substrate, followed by selectively removing the same, in order to form a data line 102 intersecting the gate line 101. In addition, both a 'U' shaped source electrode 102a overlapping the gate electrode 101a and a drain electrode 102b spaced from the source electrode are positioned on the samy layer with the data line 102 which intersects the gate line 101.

Figure 7C:
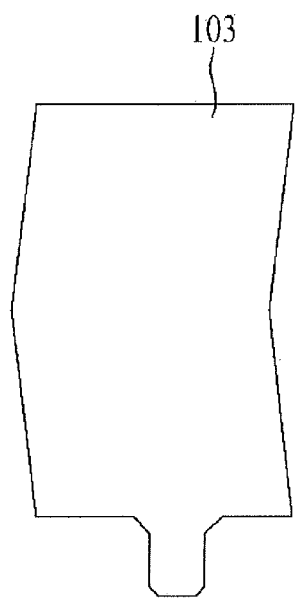

Following this, as shown in FIG. 7C, an island type pixel electrode 103 is formed using a transparent electrode material in an area of the pixel region, from which the light reflector 110 is absent. Optionally, the pixel electrode 103 may overlap the light reflector 110.

Figure 7D:
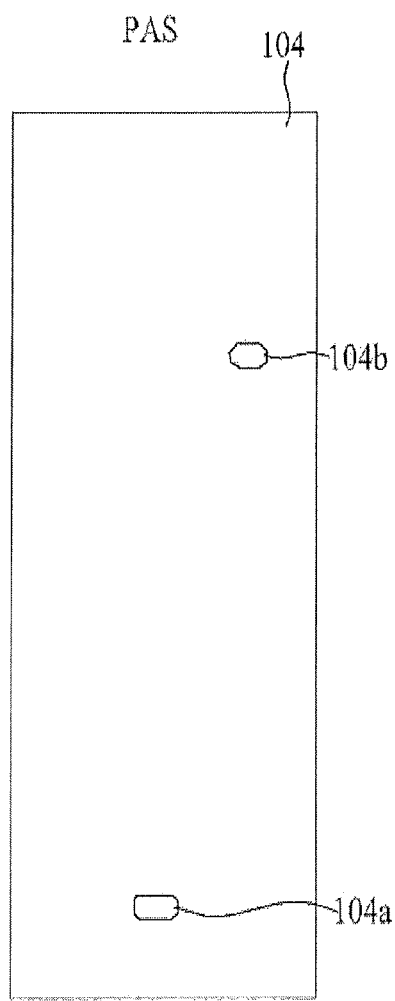

Subsequently, as shown in FIG. 7D, a protective film 104, covering the entirety of the first substrate 100, is applied, followed by selective removal thereof to form a first contact hole 104a and a second contact hole 104b.

Figure 7E:
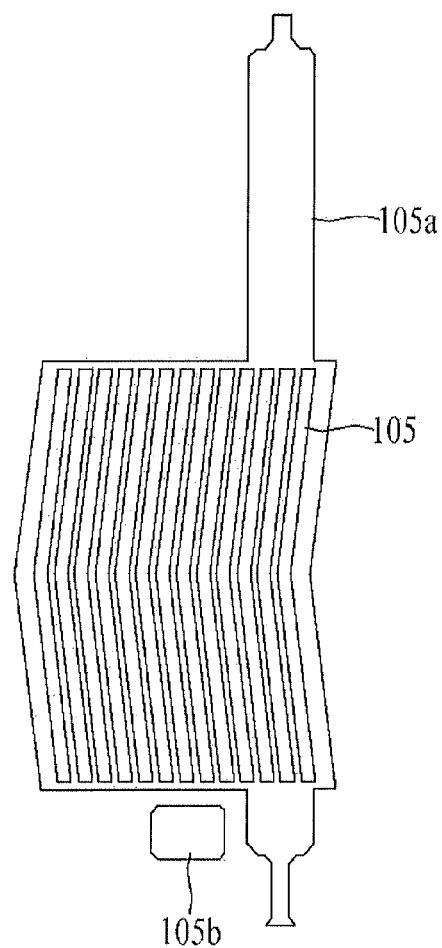

Then, as shown in FIG. 7E, after depositing the transparent electrode material throughout the substrate and patterning the same, the pixel electrode 103 firstly overlaps the patterned substrate and a branched pattern is formed in the overlapping part. A common electrode pattern 105 is formed for connection to the light reflector 110 via the second contact hole 104b. A common electrode support pattern 105a is formed to extend from the common electrode pattern 105 in a vertical direction. The common electrode support pattern 105a is connected to the light reflector 110 via the second contact hole 104b. Further, a pixel electrode support pattern 105b is formed to be electrically connected to the drain electrode 102b and a protruding part of the pixel electrode 103 via the first contact hole 104a.

Figure 7F:
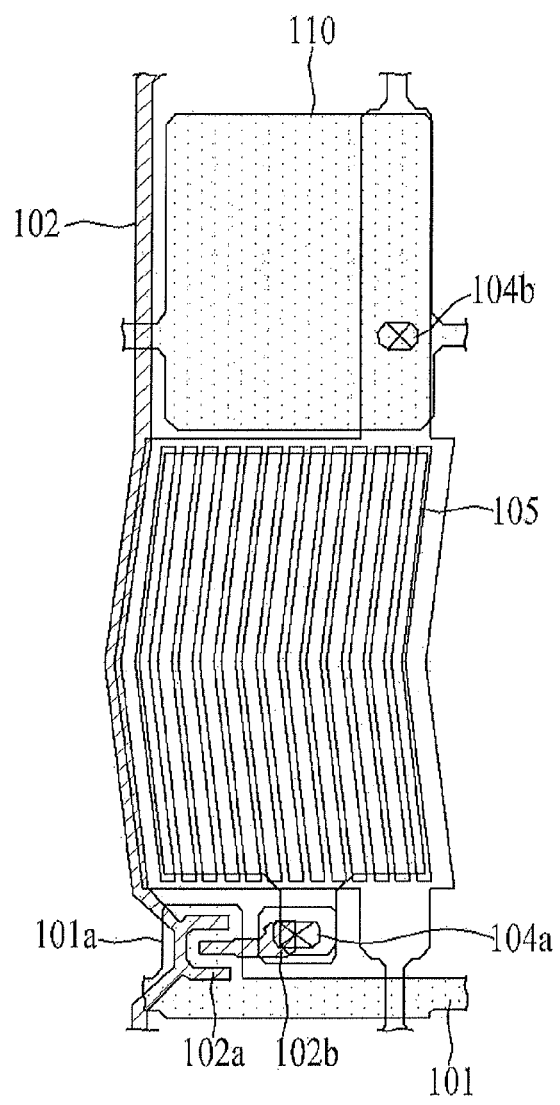

Therefore, the completed liquid crystal display device according to the above exemplary embodiment has the pixel electrode 103 connected to the drain electrode 102b via the first contact hole 104a and the common electrode 105 connected to the light reflector 110 via the second contact hole 104b, as shown in FIG. 7F.

FIGS. 8A through 8E are cross-sectional views illustrating a process of manufacturing a liquid crystal display device according to another exemplary embodiment of the present invention.

Figure 8A:
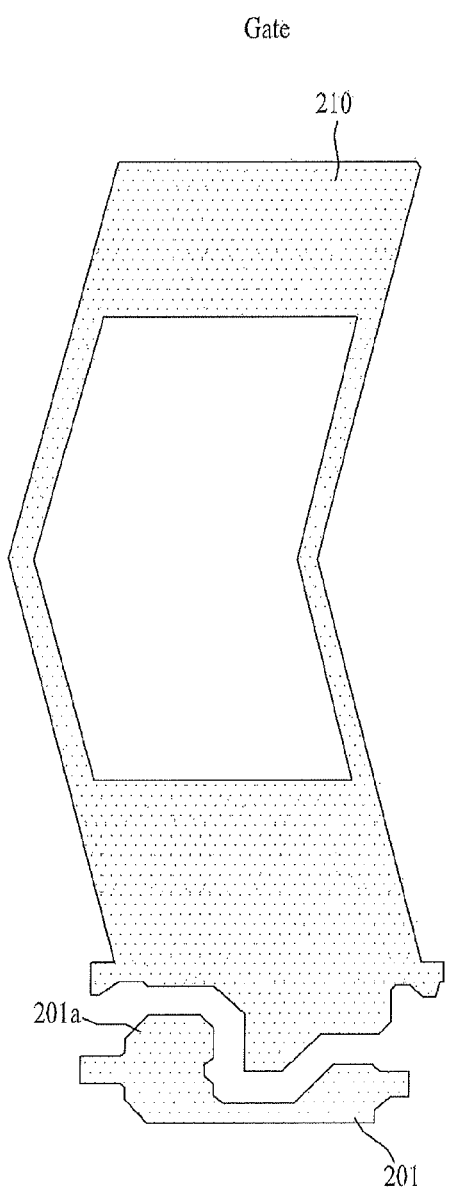
FIGS. 8A through 8E are cross-sectional views illustrating a process of manufacturing a liquid crystal display device according to another exemplary embodiment of the present invention.

First, as shown in FIG. 8A, the process of manufacturing a liquid crystal display device according to the foregoing exemplary embodiment of the present invention comprises: depositing a first metal on a first substrate and selectively removing the same, in order to form a gate line 201 in one direction and a gate electrode 201a protruding from the gate line 201; and forming a light reflector 210 occupying a predetermined area (height) in a vertical direction in a pixel region. The first metal used herein may include at least one selected from Al, Al alloy (e.g., AlNd), Mo, Mo alloy, Cr and Cu deposited in the form of a layer or a laminate comprising two or more layers.

Then, a gate insulating film (not shown) is formed throughout a front side of the first substrate including the gate line 201 and the light reflector 210.

Figure 8B:
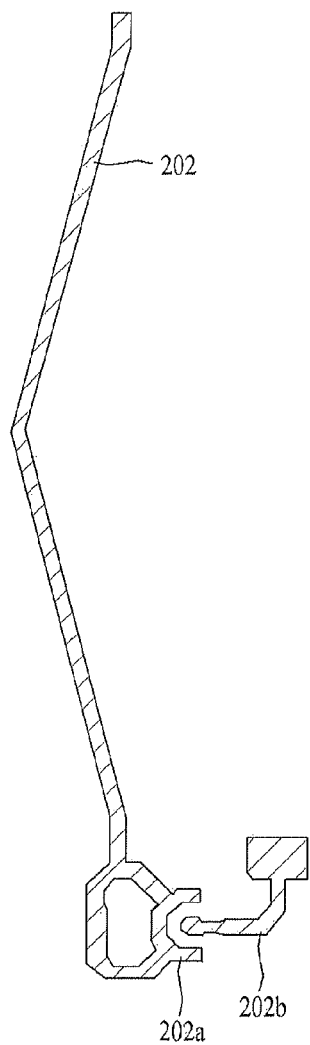

Next, as shown in FIG. 8B, a semiconductor layer (not shown) and a second metal are laminated onto the substrate, followed by selective removal of the same, in order to form a data line 202 intersecting the gate line 201. In addition, both a 'U' shaped source electrode 202a overlapping the gate electrode 201a and a drain electrode 202b spaced from the source electrode are on the same layer with the data line 202 which intersects the gate line 201. The illustrated source electrode 202a may have a specific shape formed to secure a desired channel length. However, shapes other than the above described U-shape, an L-shape for example, may be employed.

Figure 8C:
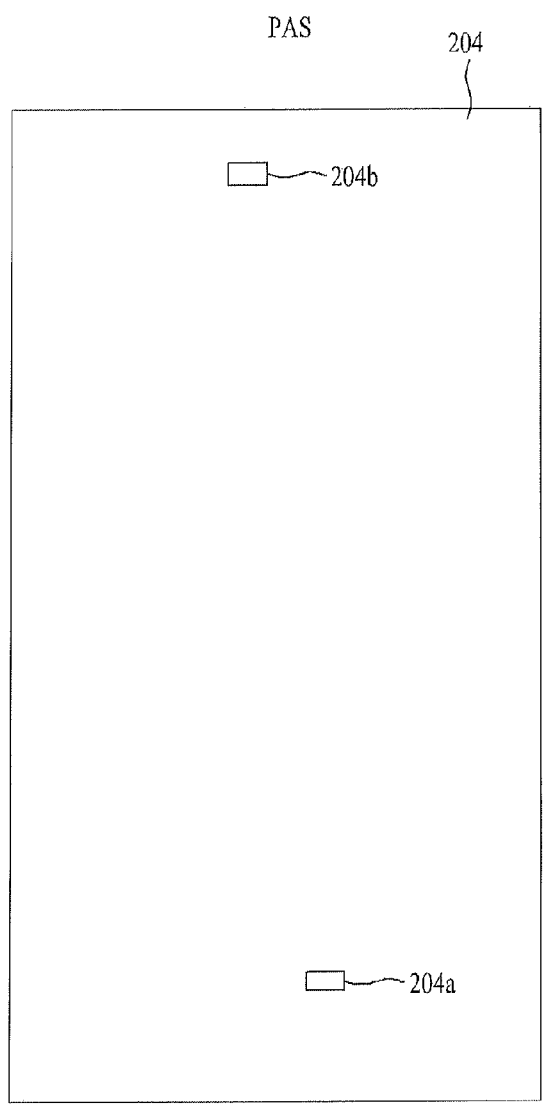

Following this, as shown in FIG. 8C, a protective film 204 covering the entirety of the first substrate is applied, followed by selective removal thereof to form a first contact hole 204a and a second contact hole 204b.

Figure 8D:
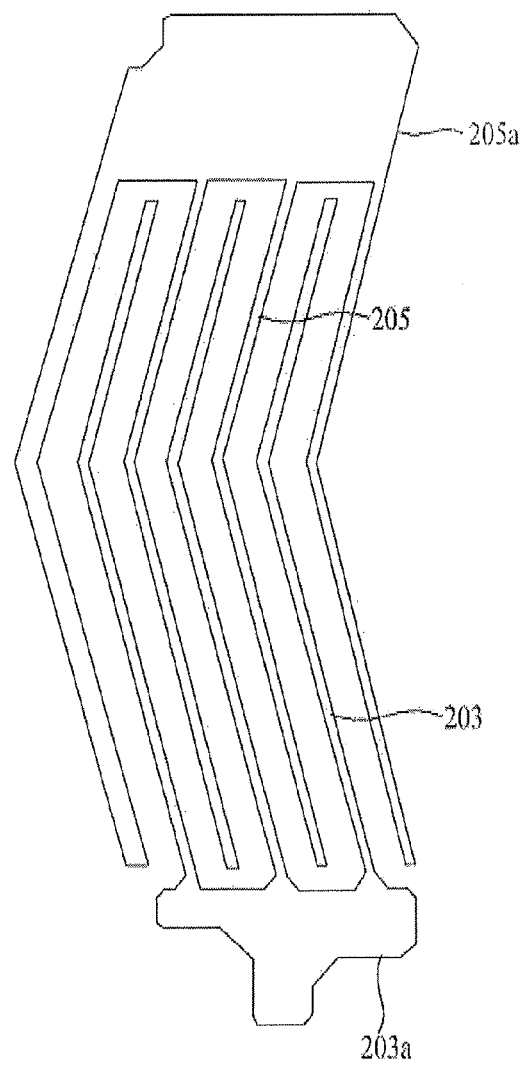

Subsequently, as shown in FIG. 8D, a plurality of pixel electrodes 203 and a plurality of common electrodes 205 are arranged alternately in the pixel region.

Here, a pixel electrode support pattern 203a is provided below the pixel region to connect the pixel electrodes 203 in a branched form and is electrically connected to the drain electrode 202b via the first contact hole 204a.

Furthermore, the common electrodes 205 are positioned on the same layer as the pixel electrodes 203, and are formed in a branched pattern such that each of the common electrodes is placed between adjacent pixel electrodes 203. Moreover, the branched common electrodes 205 are integrated with a common electrode support pattern 205a that connects the common electrodes in a branched form at a top end thereof.

The common electrode support pattern 205a is electrically connected to the light reflector 210 via a second contact hole 204b and receives applied common electrode signals.

Figure 8E:
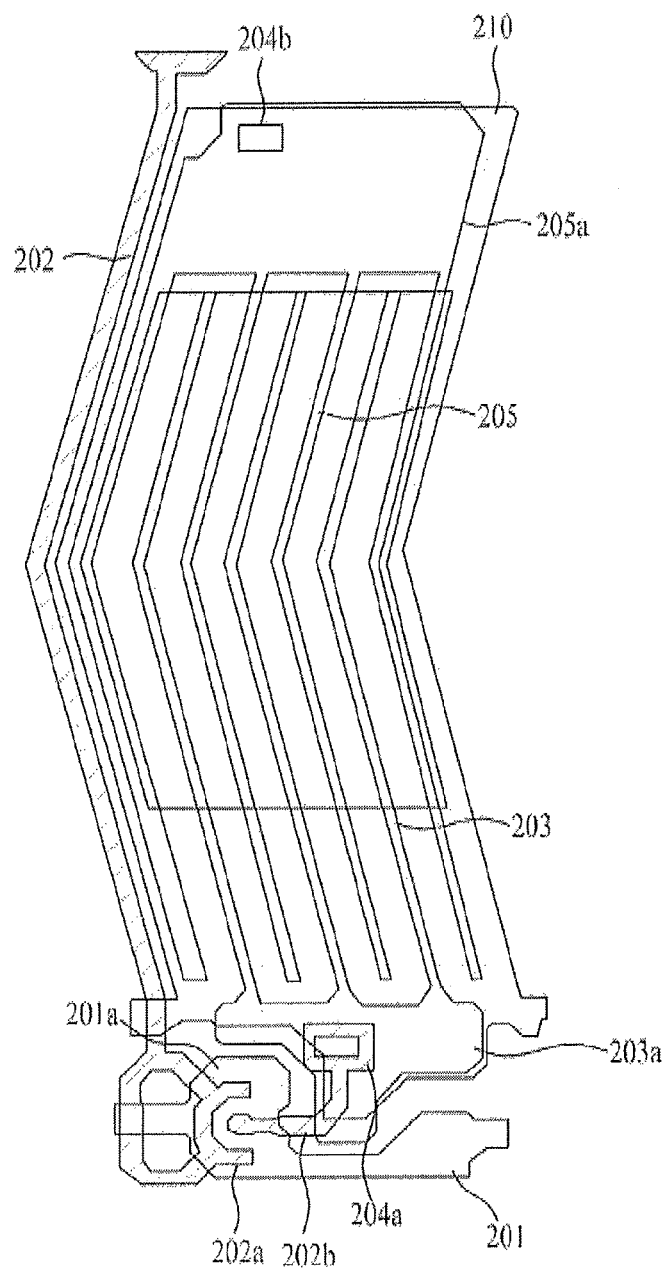

Therefore, the completed liquid crystal display device according to the above exemplary embodiment is an IPS type liquid crystal display device comprising: the pixel electrode 203 connected to the drain electrode 202b and the pixel electrode support pattern 203a via the first contact hole 204a; and the common electrode 205 connected to the light reflector 210 and the common electrode support pattern 205a via the second contact hole 204b, as shown in FIG. 8E.

As such, the liquid crystal display device according to the present invention may be fabricated using a light reflector capable of functioning as a common electrode, as required. Additionally, without particular limitation to IPS or FES mode described above, a TN display device, or the like, may be embodied with the light reflector.

Among the foregoing methods for manufacturing a liquid crystal display device, respective processes of fabricating the remaining components other than the first substrate will be described in detail with reference to FIG. 3.

That is, after completing fabrication of the first substrate as described above, a second substrate including a first black stripe 160, a second black stripe 165 and a color filter (not shown) is positioned facing the first substrate 100, followed by formation of a liquid crystal layer 170 between the first and second substrates 100 and 150, thereby producing a liquid panel.

Next, after positioning a light guide plate 400 and providing a reflector 410 on top of the light guide plate 400, a light source 450 is arranged on either or both sides of the light guide plate 400.

The liquid panel having the first and second stripes 160 and 165 (see FIG. 5) provided on the first and second substrates is mounted on top of the reflector 410 fabricated as described above.

Thereafter, a retarder 500 is provided on top of the second substrate 150.

As described above, a liquid crystal display device and a manufacturing method thereof according to the present invention provide the following effects.

With regard to a structure comprising a retarder for stereoscopic image display, a light reflector is formed inside a liquid crystal panel in order to prevent an increase in aperture ratio when a black stripe is present between pixels emitting left and right images. Therefore, luminous efficiency may be enhanced by double reflection through a reflector as well as the light reflector positioned at the light source side on a lower part of the panel.

In addition, patterning the light reflector using the same metal as is used for the gate line or data line may improve luminous efficiency without requiring additional processes.

Moreover, the light reflector is provided on the same layer as the gate line and the data line, thus enabling slimness of the structure having the light reflector The present invention is not restricted to the exemplary embodiments and the accompanying drawings described above, and those skilled in the art will appreciate that the present invention may cover substitutions, variations and/or modifications thereof without departing from the scope of the invention defined in the appended claims.

The invention claimed is:

1. A liquid crystal display device, comprising:
   first and second substrates arranged opposite each other;
   a liquid crystal layer formed between the first and second substrates;
   a. retarder placed above top of the second substrate, the retarder divided into a left image display region and a right image display region per each pixel region;
   a first black stripe formed on bottom of the second substrate, the first black stripe corresponding to an adjacent part between the left and right image display regions;
   a light reflector formed on the first substrate, the light reflector corresponding to the adjacent part;
   a bottom reflector placed below bottom of the first substrate, the bottom reflector facing the light reflector;
   a light source positioned below the bottom reflector,
   a gate line and a data line formed on the first substrate, wherein the gate line and the data line intersect each other to define the pixel region, and
   a second black stripe formed on bottom of the second substrate to shield the gate line and the data line,
   wherein the first substrate is placed between the light reflector and the bottom reflector.

2. The liquid crystal display device according to claim 1, further comprising a light guide plate arranged below the bottom reflector, in order to guide light emitted from the light source upward,
   wherein the light source is mounted on edge part of the light guide plate.

3. The liquid crystal display device according to claim 1, further comprising first and second polarizers mounted on outer surfaces of the first and second substrates, respectively.

4. The liquid crystal display device according to claim 3, wherein the retarder is positioned on the second polarizer.

5. The liquid crystal display device according to claim 4, wherein the retarder is a film type retarder patterned having different light transmission axes corresponding to the left and right image display regions.

6. The liquid crystal display device according to claim 4, wherein the retarder is an electrically switchable retarder having the left and right image display regions divided from each other by applied electric field.

7. The liquid crystal display device according to claim 1, wherein a common line signal is applied to the light reflector.

8. The liquid crystal display device according to claim 7, further comprising a pixel electrode and a common electrode alternating each other, in the pixel region.

9. The liquid crystal display device according to claim 7, further comprising an island type pixel electrode and a common electrode pattern having a plurality of branched patterns while overlapping the pixel electrode, in the pixel region.

10. The liquid crystal display device according to claim 7, wherein the light reflector contains at least one selected from Al, Al alloy, Mo, Mo alloy, Cr and Cu, and is formed of at least one layer.

11. The liquid crystal display device according to claim 1, wherein the light reflector is on the same layer on which one of the gate line and the data line is present.

12. The liquid crystal display device according to claim 1, wherein the retarder is on one surface of the second substrate facing to the first substrate.

13. A method of manufacturing a liquid crystal display device comprising:
   positioning a light guide plate and arranging a light source at either side or both sides of the light guide plate;
   placing a bottom reflector on the light guide plate;
   placing a first substrate on a top surface of the bottom reflector;
   forming a light reflector, a plurality of gate lines and a plurality of data lines on the first substrate, wherein the plurality of gate lines and data lines intersect each other to define the pixel region;
   arranging a second substrate to face the first substrate, wherein the second substrate has a first black stripe corresponding to the light reflector and a second black stripe shielding the plurality of gate lines and the plurality of data lines;
   forming a liquid crystal layer between the first and second substrates; and
   forming a retarder above top of the second substrate, and wherein the retarder is divided into a left image display region and a right image display region per each pixel region,
   wherein the first black stripe and the light reflector are corresponding to an adjacent part between the left and right image display regions,
   wherein the bottom reflector faces the light reflector,
   wherein the first substrate is placed between the light reflector and the bottom reflector.

14. The method according to claim 13, wherein the light reflector is on the same layer on which one of the gate line and the data line is present.

15. The method according to claim 14, further comprising: forming a pixel electrode and a common electrode to alternate each other in the pixel region.

16. The method according to claim 14, further comprising: forming an island type pixel electrode and a common electrode pattern having a plurality of branched patterns while overlapping the island type pixel electrode, in the pixel region.

\* \* \* \* \*

UNITED STATES PATENT AND TRADEMARK OFFICE
CERTIFICATE OF CORRECTION

| | | |
|---|---|---|
| PATENT NO. | : 8,908,111 B2 | Page 1 of 1 |
| APPLICATION NO. | : 13/185293 | |
| DATED | : December 9, 2014 | |
| INVENTOR(S) | : Min-Jic Lee | |

It is certified that error appears in the above-identified patent and that said Letters Patent is hereby corrected as shown below:

<u>On the Title Page</u>

Left column, item (75), replace "Min-Jic Le" with --Min-Jic Lee--.

Signed and Sealed this
Twenty-first Day of April, 2015

Michelle K. Lee
*Director of the United States Patent and Trademark Office*